United States Patent
Utenick et al.

[11] Patent Number: 5,969,899
[45] Date of Patent: Oct. 19, 1999

[54] ENHANCED METHOD AND SYSTEM OF UNLOADING MAGNETIC HEADS

[75] Inventors: Michael R. Utenick, Niwot; Dan A. Hunter, Boulder; James M. Jones, Boulder; Thomas L. Andrews, Jr., Boulder, all of Colo.

[73] Assignees: Mobile Storage Technology, Inc., Boulder, Colo.; Samsung Electronics Co., Ltd., Seoul, Rep. of Korea

[21] Appl. No.: 08/832,029

[22] Filed: Apr. 2, 1997

[51] Int. Cl.[6] ................................................ G11B 5/596
[52] U.S. Cl. ............................................ 360/78.04; 360/75
[58] Field of Search ................................ 360/78.04, 75

[56] References Cited

U.S. PATENT DOCUMENTS

| | | | |
|---|---|---|---|
| 4,237,501 | 12/1980 | Barmache et al. | 360/75 |
| 4,358,728 | 11/1982 | Hashimoto | 323/275 |
| 5,495,156 | 2/1996 | Wilson et al. | 318/368 |

FOREIGN PATENT DOCUMENTS

0 537 916 A2  4/1993  European Pat. Off. ........ G11B 19/20

*Primary Examiner*—Aristotelis M. Psitos
*Assistant Examiner*—Dan I. Davidson
*Attorney, Agent, or Firm*—Skjerven, Morrill, MacPherson, Franklin & Friel LLP; David W. Heid

[57] ABSTRACT

An enhanced method and system for unloading magnetic heads are disclosed. The system limits the maximum and minimum speed of the actuator while unloading the heads during a power failure. A BEMF control circuit monitors the velocity of the actuator using the BEMF of the actuator as a gauge of the velocity. The BEMF control circuit uses a sense resistor to remove the inherent resistive component of the actuator from its BEMF measurement. If the velocity of the actuator increases above a safe level the BEMF control circuit decreases actuator current to prevent further acceleration. If the velocity of the actuator decreases below a safe level the BEMF control circuit increases the actuator current to accelerate the actuator to a safe level.

6 Claims, 13 Drawing Sheets

ENHANCED METHOD AND SYSTEM OF UNLOADING MAGNETIC HEADS

BACKGROUND OF THE INVENTION

1. Field of the Invention

The present invention relates to motor control systems for disk drive apparatus, and more particularly to control of actuator power to control head velocity during emergency head retraction.

2. Description of the Prior Art

Disk drives, particularly those used in portable and battery operated equipment, are subject to unexpected power system variations, such as loss of power supply and power failures. Damage to the magnetic disk as well as the read/write heads can occur during power loss conditions if a head crashes onto the disk. For disk drives using dynamic head loading the heads must be successfully unloaded to avoid such a crash. One method to unload the heads is described in U.S. Pat. No. 4,933,785 entitled "Disk Drive Apparatus Using Dynamic Loading/Unloading," which uses the rotational energy stored in the spin motor and disk assembly.

Figure 1:
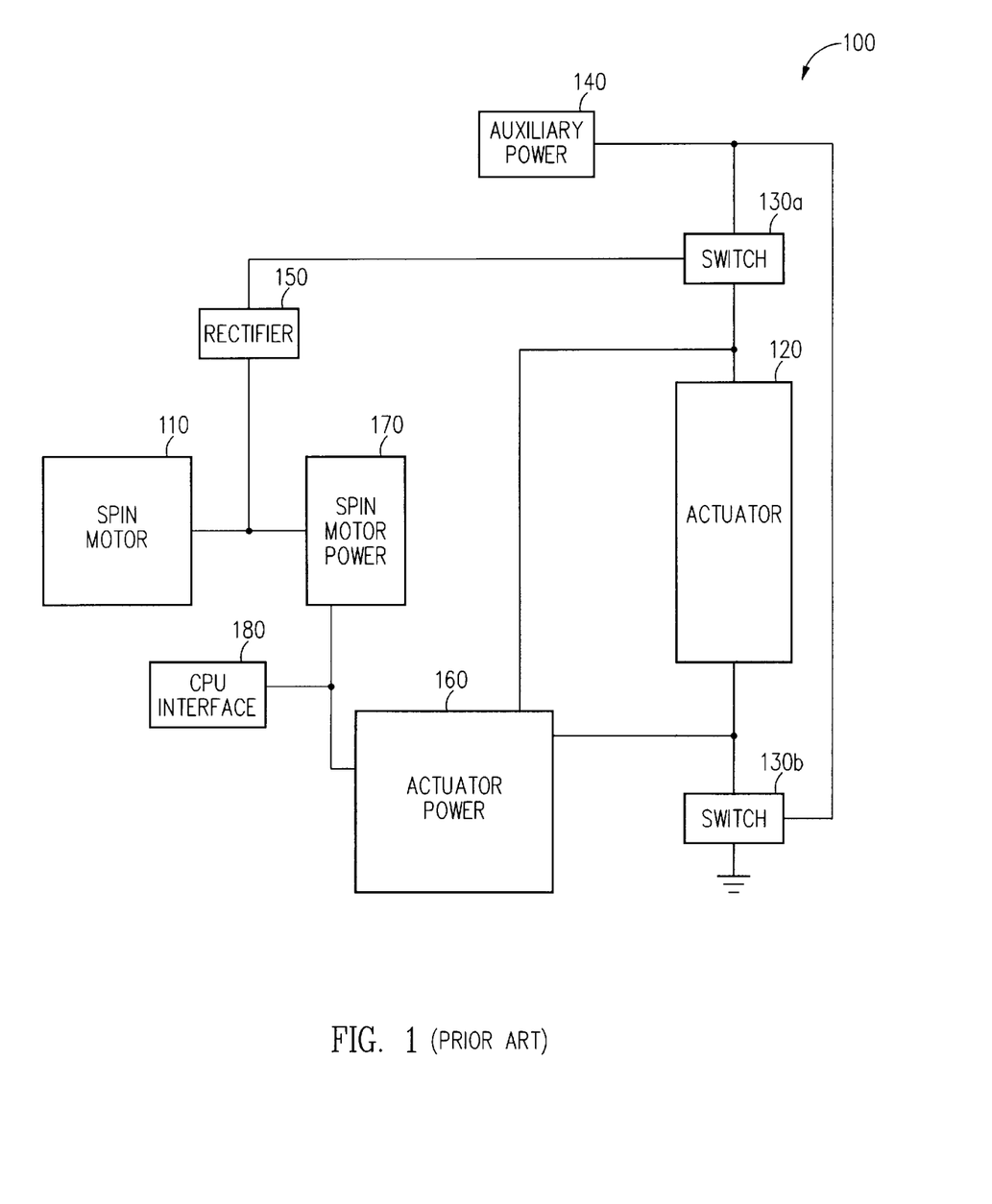
FIG. 1 shows a simplified block diagram of a prior art head unloading system.

FIG. 1 provides a simplified block diagram of conventional head unloading system 100. The disk is controlled by a CPU (not shown) through CPU interface 180. Under normal operations actuator 120 is powered by actuator power source 160, while spin motor power source 170 drives spin motor 110. Switches 130a and 130b normally prevent any power from spin motor 110 from reaching actuator 120. During a power failure, switches 130a and 130b connect spin motor 110 with actuator 120 so that spin motor 110 acts as a DC generator. The electrical power generated by the back electromotive force (BEMF) of spin motor 110 is directed to actuator 120 through rectifier 150 and switches 130a and 130b. The heads (not shown), which are mounted on an actuator arm (not shown), are moved onto the unloading cam (not shown) into a parked condition. In addition, auxiliary power source 140 is used to power the logic devices used to control the unloading mechanism during a power failure.

The major problem with conventional unloading systems is that the design of a head unloading system requires a compromise between two conflicting conditions. If the heads are positioned near the outside diameter (O.D.) of the disk, the actuator travels only a short distance before hitting the unloading cam. Thus, a large actuator current is necessary to create the rapid acceleration needed to ensure that the heads reach a great enough velocity to climb the unloading cam. However if the heads are positioned near the inner diameter of the disk, the actuator travels a larger distance and builds up a greater velocity before hitting the unloading cam. The velocity of the actuator may be great enough to damage the heads when the actuator hits the outer crash stop. Typically, a resistor is inserted in series with the actuator motor to reduce the acceleration and velocity of the actuator. However, the insertion of the resistor further hampers the rapid acceleration needed when the heads are positioned near the outside diameter. The two conflicting conditions are explained in detail below with respect to FIGS. 2 and 3.

Figure 2:
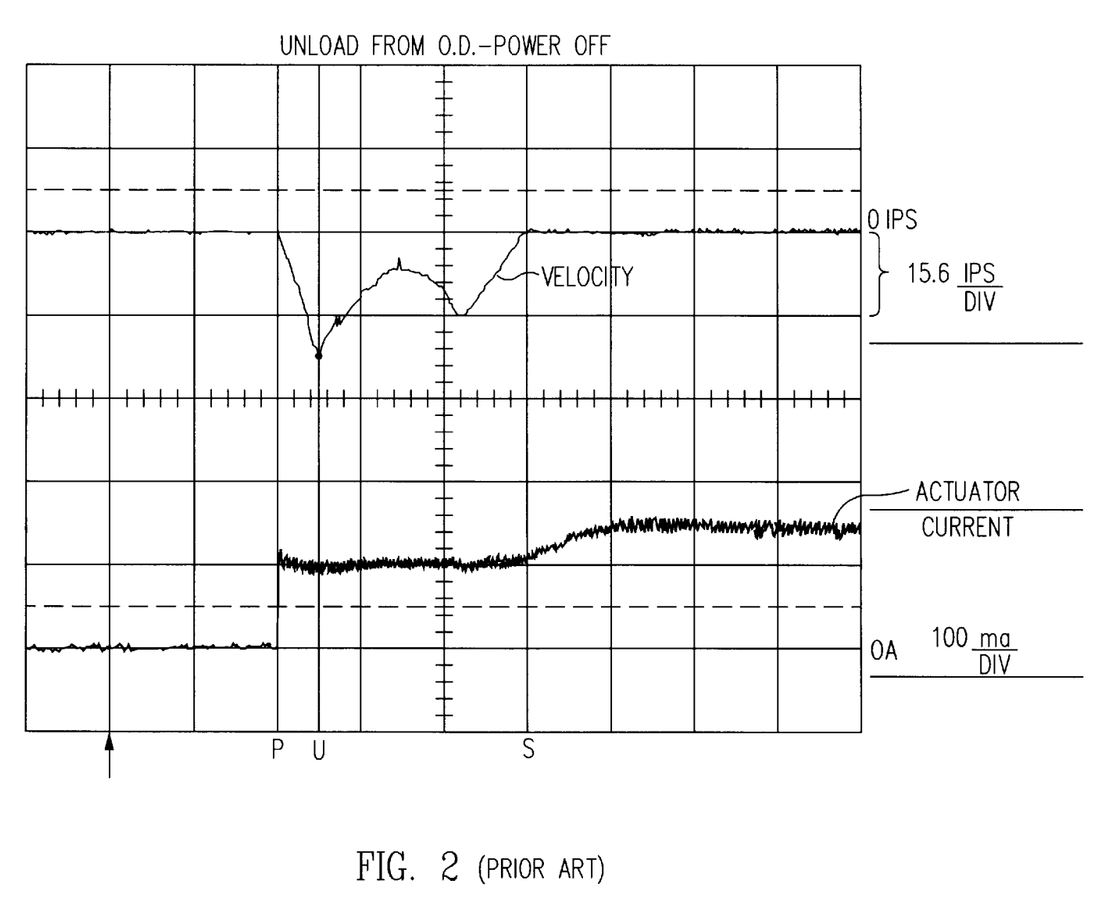
FIG. 2 graphs the velocity vs time and actuator current vs time of a prior art head unloading system when the heads are over an outer diameter of the disk at the start of a power failure.

FIG. 2 shows the velocity vs time of the heads, which were located over an outer diameter of the disk, during a power failure condition. As explained above, if the heads are positioned near the outside diameter (O.D.) of the disk, the actuator travels only a short distance before hitting the unloading cam. In such a short distance, the actuator assembly does not have enough time to accelerate to a sufficient velocity to overcome the frictional forces encountered on the unloading cam. In addition, FIG. 2 also shows the actuator current vs time during the power failure. Time P marks the power failure condition; time U marks the instant when the heads make contact with the unloading cam; and time S marks the instant when the heads make contact with the outer crash stop. Until time U, the heads are accelerated to a velocity of approximately 22.64 inches per seconds (ips).

If the heads begin to climb the ramp with insufficient velocity, the heads may slow on the ramp surface and not be fully unloaded. As the heads climb the inclined portion of the unloading cam, the velocity of the heads is reduced to approximately 6.24 ips. During this time the heads are not "flying properly" because the suspension down-force has been partially removed. If the heads remain on the ramp surface for as little as 0.5 mS, the heads may pitch or roll and contact the disk surface which may damage the heads and the disk. Once the heads pass the inclined portion of the unloading cam, the heads begin to accelerate into the valley portion of the cam and finally come to rest against the outer crash stop at time S. Since a higher velocity is necessary to insure that the heads are not damaged, a high driving force on the actuator is desired when the heads are located near the outer diameter.

Figure 3:
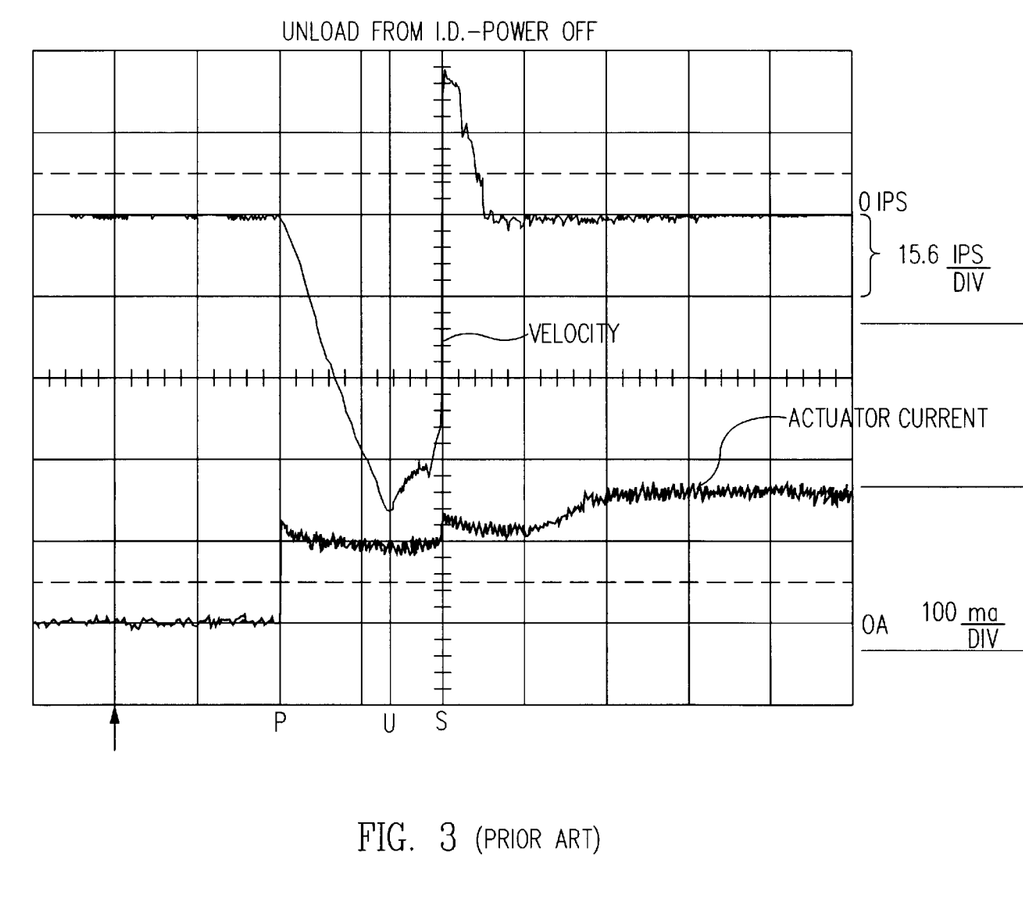
FIG. 3 graphs the velocity vs time and actuator current vs time of a prior art head unloading system when the heads are over an inner diameter of the disk at the start of a power failure.

However, when the heads are located near the inner diameter of the disk, the actuator arm is a large distance away from the unloading cam. Therefore, the actuator arm accelerates to a high velocity before reaching the unloading cam. As shown in FIG. 3, the heads can reach a velocity of approximately 56 ips before the heads reach the unloading cam at time U. The head velocity is reduced slightly by the inclination of the unloading cam; however, the velocity remains approximately 47.4 ips upon impact with the outer crash stop. At that velocity, the heads bounce off the outer crash stop at a velocity of approximately 27.45 ips in the opposite direction before being forced against the outer crash stop by the actuator current. Such a rapid change of velocity is likely to damage the magnetic heads.

Figure 4:
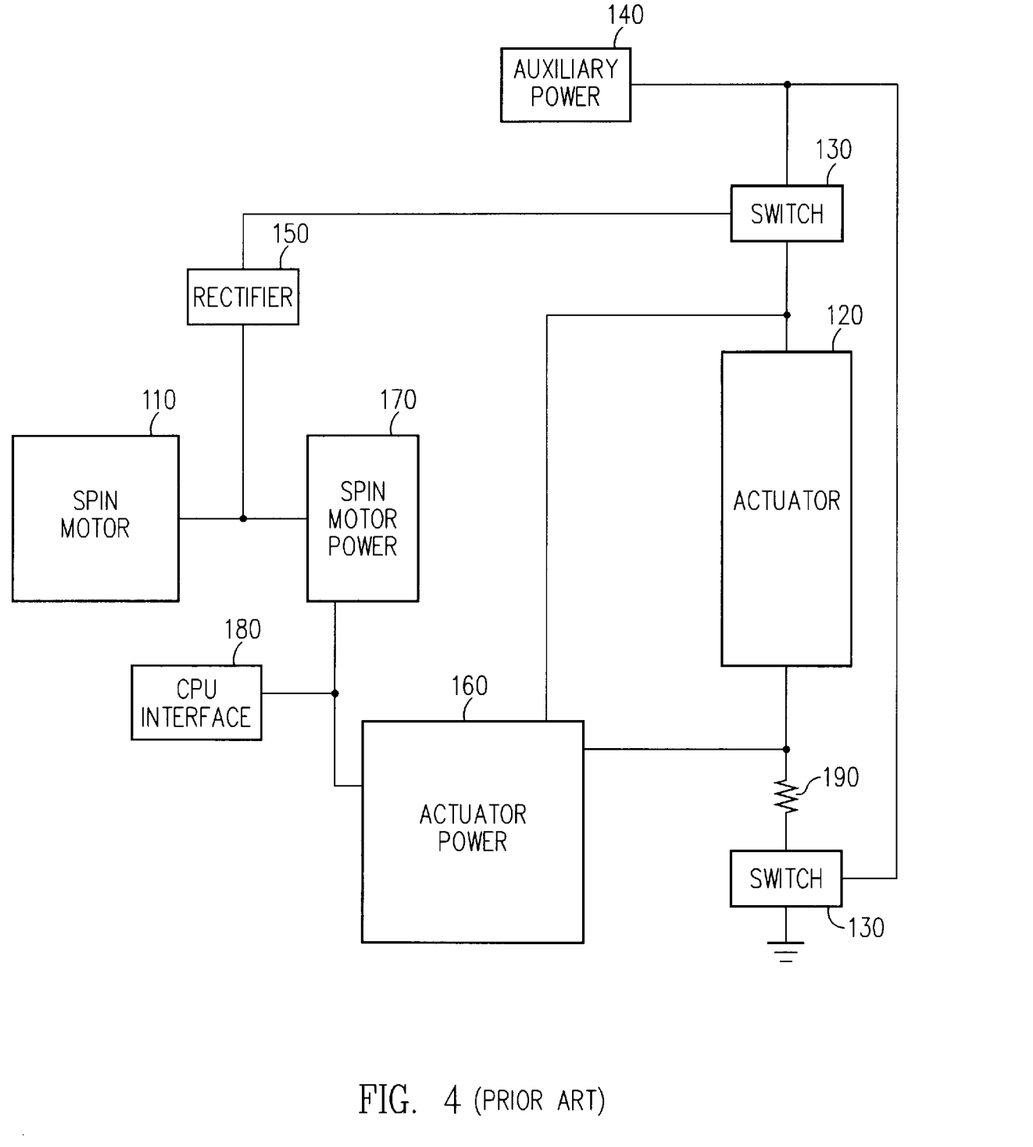
FIG. 4 shows a simplified block diagram of a second prior art head unloading system.

To reduce the speed of the actuator arm the voltage to the actuator assembly is reduced by placing a resistor 190 (FIG. 4) in series with actuator 120. However, reduction of the actuator voltage and actuator speed would increase the problem of inadequate speed if the magnetic heads are near the outer diameter of the disk when the power fails. Therefore optimization of the unloading mechanism requires contradictory actions depending on whether the magnetic heads are near the inner or outer diameter of the disk when a power failure occurs.

Figure 5A:
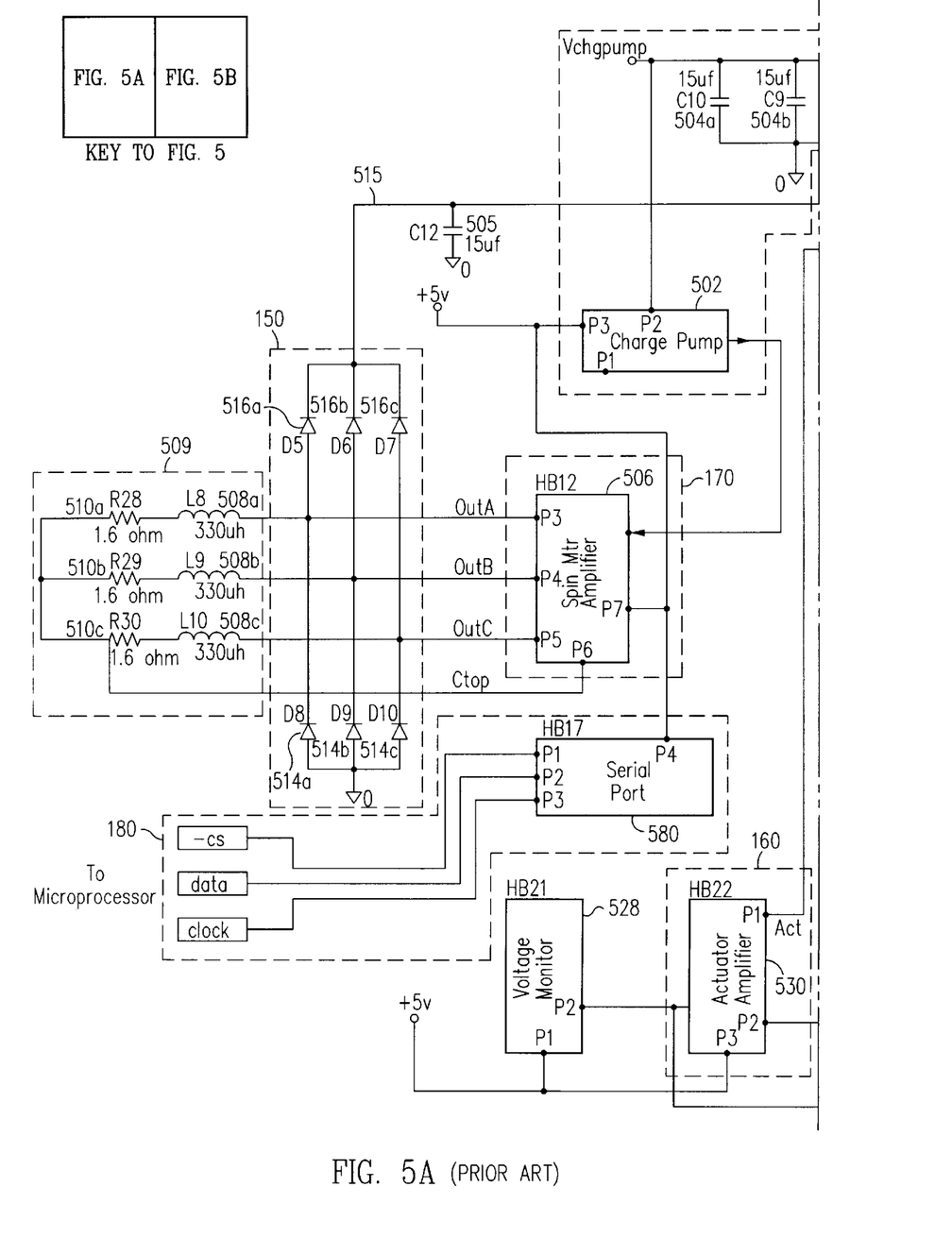
FIG. 5 shows a circuit diagram of a prior art head unloading system.
Figure 5B:
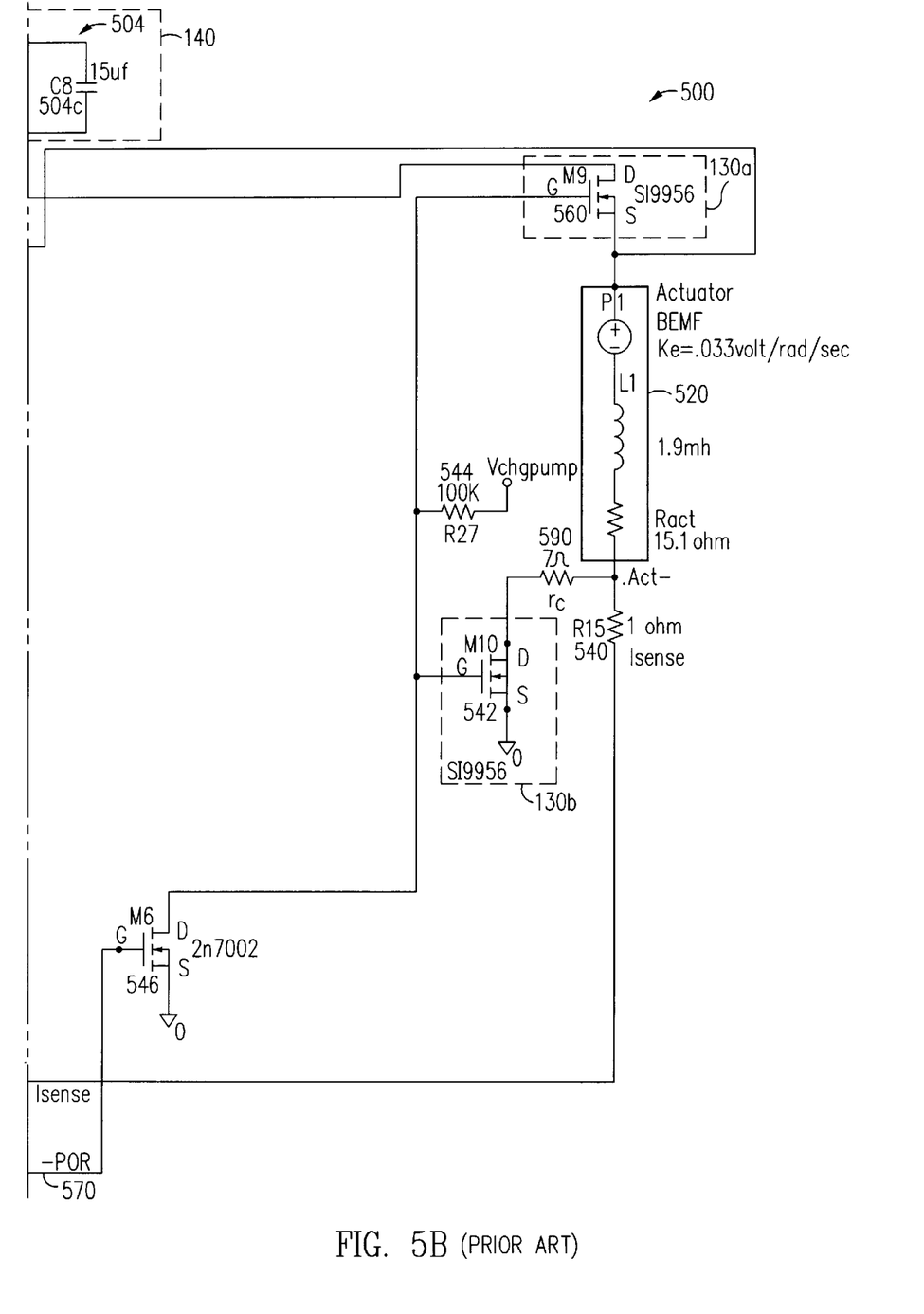

FIG. 5 shows a more detailed disk circuitry 500 containing an unloading mechanism. The disk circuitry is controlled by a CPU (not shown) through serial port 580. Under normal operations positive terminal Act+ of actuator 520 receives power from actuator amplifier 530. Negative terminal Act– of actuator 520 is coupled to a first end of the sense resistor 540. The second end of the sense resistor 540 is coupled to actuator amplifier 530.

Charge pump 502, which is used to supply bias voltages as required by spin motor amplifier 506, energizes auxiliary power supply 504, which is used only during power failures to power the head unloading circuits. Auxiliary power supply 504 is constructed to supply energy to the head unloading circuit for a much greater interval than is necessary to retract the heads from the disk, for example 60 mS. As shown in FIG. 5, a suitable auxiliary power supply can be constructed with three capacitors 504a, 504b, and 504c coupled in parallel between charge pump 502 and ground.

Three phase spin motor 509 is represented by inductors 508a, 508b, or 508c and a resistors 510a, 510b, or 510c.

Three phase spin motor 509 is also coupled to the actuator through rectifier 150 and a field effect transistor (FET) 560.

For three phase spin motor 509, rectifier 150 is a three-phase rectifier comprising diodes 514a, 514b, and 514c which have their anodes coupled to grounds and their cathodes coupled to power phase a, b, and c respectively. Rectifier 150 further comprises diodes 516a, 516b, and 516c with their anodes coupled to power phases a, b, and c respectively and their cathodes coupled together to drain D of FET 560. Line 515 between rectifier 150 and FET 560 is also coupled to ground through capacitor 505 to stabilize the voltage.

Source terminal S of FET 560 is coupled to positive terminal Act+ of actuator 520. FET 560 acts as switch to provide power from three phase spin motor 509 to actuator 520 during a power failure. Gate G of FET 560 is coupled to drain D of FET 546. Source S of FET 546 is coupled to ground and gate G of FET 546 is coupled to "Power On/Reset" (POR) line 570. The voltage on POR line 570 is controlled by voltage monitor 528. Under normal operations POR line 570 is pulled high by voltage monitor 528; therefore, FET 546 conducts and pulls gate G of FET 560 and gate G of FET 542 low to prevent any power from three phase spin motor 509 reaching actuator 520. However, once a power failure occurs the voltage on POR line 570 goes low, which turns off FET 546 and allows gate G of FET 560 to be pulled high by auxiliary power supply 504 through resistor 544.

During a power failure, FET 542 which has gate G coupled to drain D of FET 546, source S coupled to ground, and drain D coupled to negative terminal Act− of actuator 520 through resistor 590, provides the ground path for actuator 520. Resistor 544 is coupled to auxiliary power supply 504 to pull gate G of FET 542 and FET 560 high during a power failure. FET 546, which has source S coupled to ground and gate G coupled to POR line 570, pulls gate G of FET 542 and FET 560 low during normal operations to prevent FET 542 from providing a ground path for actuator 520 and to prevent FET 560 from providing power from three phase spin motor 509 to actuator 520.

Hence there is a need for a method or a circuit to perform dynamic head unloading regardless of the position of the heads at the onset of a power failure. Specifically, the method or circuit must satisfy the conflicting need of greater unloading force when the heads are positioned near the outside diameter of the disk with the need of lower unloading force when the heads are positioned near the inner diameter of the disk.

SUMMARY

In accordance with the present invention, a method and a system are disclosed for unloading magnetic heads during a power failure. The system limits the maximum and minimum speed of the actuator by controlling the actuator current. Since the velocity of the actuator is proportional to the back electro-motive force (BEMF) of the actuator, the system measures the BEMF of the actuator to determine the velocity of the actuator.

However, direct measurement of the BEMF of an actuator is not possible since an actuator has both an inductive component and a resistive component. A BEMF control circuit measures the BEMF of the actuator and compensates for the inherent resistance of the actuator by subtracting the voltage drop through a sense resistor. The BEMF control circuit controls an amplifier which regulates power from a three phase spin motor to the actuator.

If the velocity of the actuator increases above a safe range, the BEMF of the actuator also increases to a level which causes BEMF control circuit to reduce the amount of current allowed through the amplifier and thereby prevent further acceleration of the actuator. If the velocity of the actuator falls below a safe minimum speed the BEMF control circuit increases the actuator current to accelerate the actuator to a safer speed.

By limiting the maximum and minimum speed of the actuator during a power failure, the present invention provides a head unloading system which minimizes the risk of damage to the heads.

DETAILED DESCRIPTION

According to the principles of this invention a unique actuator BEMF control circuit eliminates the prior art problems associated with a power failure in a disk drive, which utilizes dynamic head unloading systems. The present invention controls the velocity of the read/write heads by adjusting the actuator current based on the velocity of the actuator coil of the actuator arm on which the read/write heads are attached. The present invention prevents the read/write heads from accelerating beyond a safe velocity when the read/write heads are located at the inner diameter of the magnetic disk when a power failure occurs. Furthermore, the present invention increases the velocity of the read/write heads to prevent them from pitching or rolling on the unloading cam when the read/write heads are located at the outer diameter of the magnetic disk when a power failure occurs.

Figure 6:
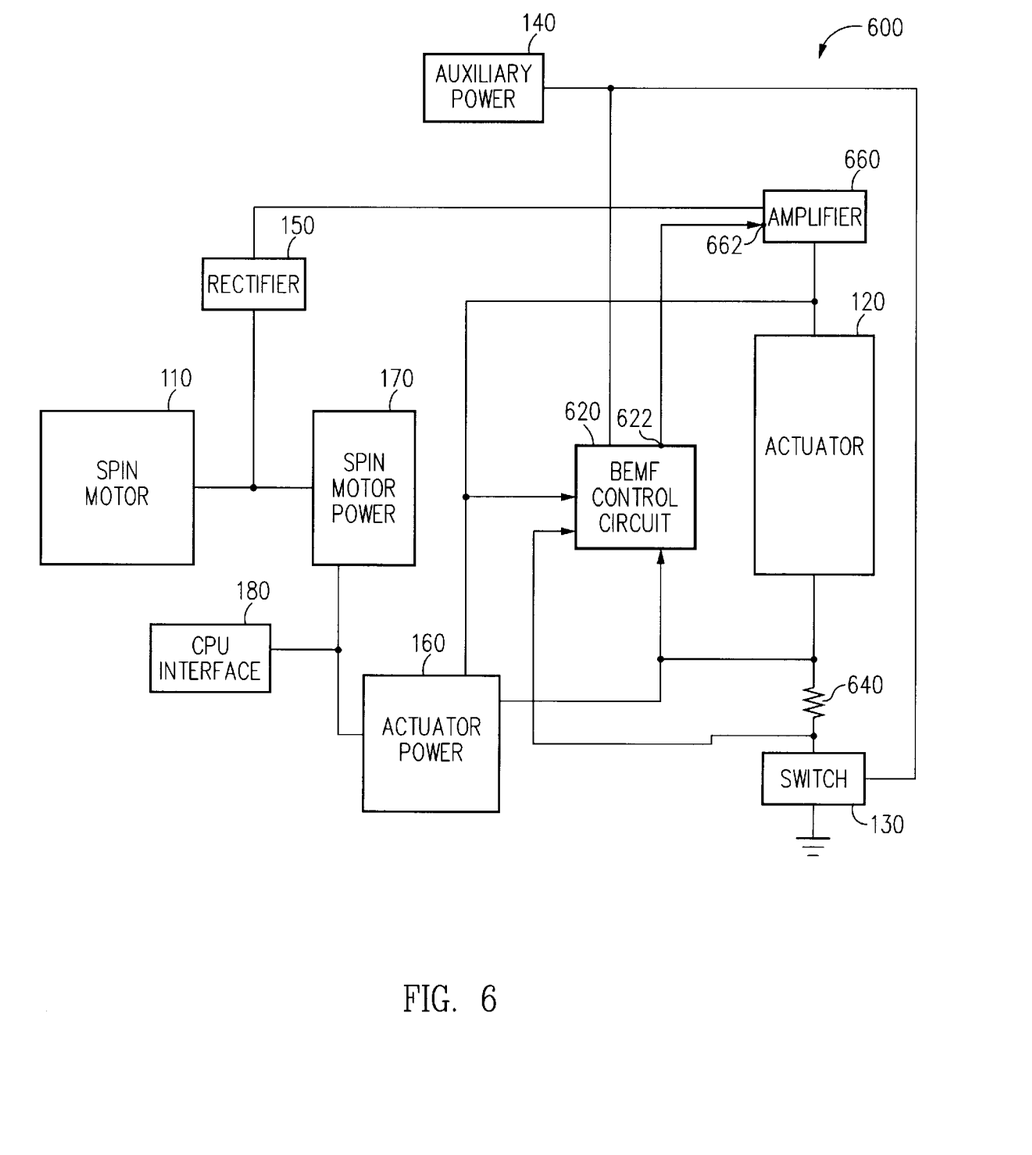
FIG. 6 shows a simplified block diagram of a head unloading system according to one embodiment of the present invention.

FIG. 6 shows a simplified block diagram of one embodiment of the unloading mechanism of the present invention.

The disk mechanism is controlled by a CPU (not shown) through CPU Interface 180. Amplifier 660 regulates the flow of current from rectifier 150 to actuator 120. Actuator BEMF control circuit 620 gauges the velocity of the heads using current sense resistor 640 to measure the current generated in the actuator coil of actuator 120 and monitoring the voltage across actuator 120. In some embodiments of the unloading mechanism, amplifier 660 is incorporated into actuator BEMF control circuit 620. The BEMF of actuator 120 is proportional to the velocity of the heads. Output control terminal 622 of actuator BEMF control circuit 620 is coupled to input control terminal 662 of amplifier 660 so that actuator BEMF control circuit 620 can control amplifier 660. Specifically, actuator BEMF control circuit 620 causes amplifier 660 to regulate the actuator by decreasing the actuator current if the heads are moving too rapidly and increasing the actuator current if the heads are moving too slowly.

Since the actuator current is selectively applied, a head unloading system in accordance with the present invention can use a higher actuator current than prior art systems without accelerating the heads to a dangerous speed. With the higher actuator current, a head unloading system, in accordance with the present invention, prevents the heads from slowing to a dangerous level on the ramp.

Figure 7:
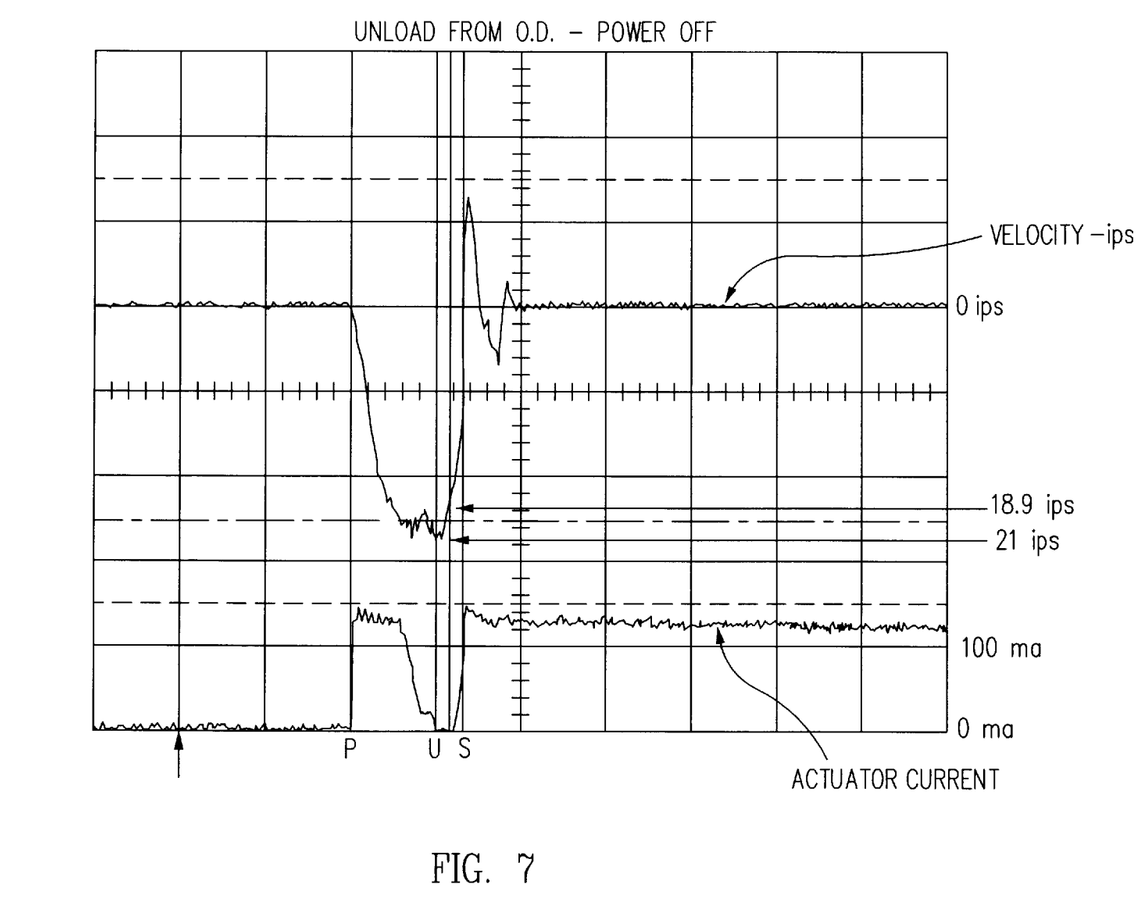
FIG. 7 graphs the velocity vs time and actuator current vs time of a head unloading system according to one embodiment of the present invention when the heads are over an outer diameter of the disk at the start of a power failure.

FIG. 7 depicts the velocity of the heads vs time as well as the actuator current vs time when the heads are near an outer diameter of the disk at the start of a power failure. As shown in FIG. 7, the actuator current is 30–40% greater than the prior art system shown in FIG. 2. As the head velocity surpasses approximately 21 inches per seconds (ips), the actuator current is reduced to zero to prevent further acceleration. After the heads reach the unloading cam at time U and slow down to approximately 18.9 ips, the actuator current is again increased to prevent the heads from slowing to a dangerously low velocity. The heads hit the outer crash stop at time S. The heads are subjected to small bounces off of the outer crash stop but are eventually brought to rest against the outer crash stop. The actuator current continues to force the heads against the outer crash stop.

Figure 8:
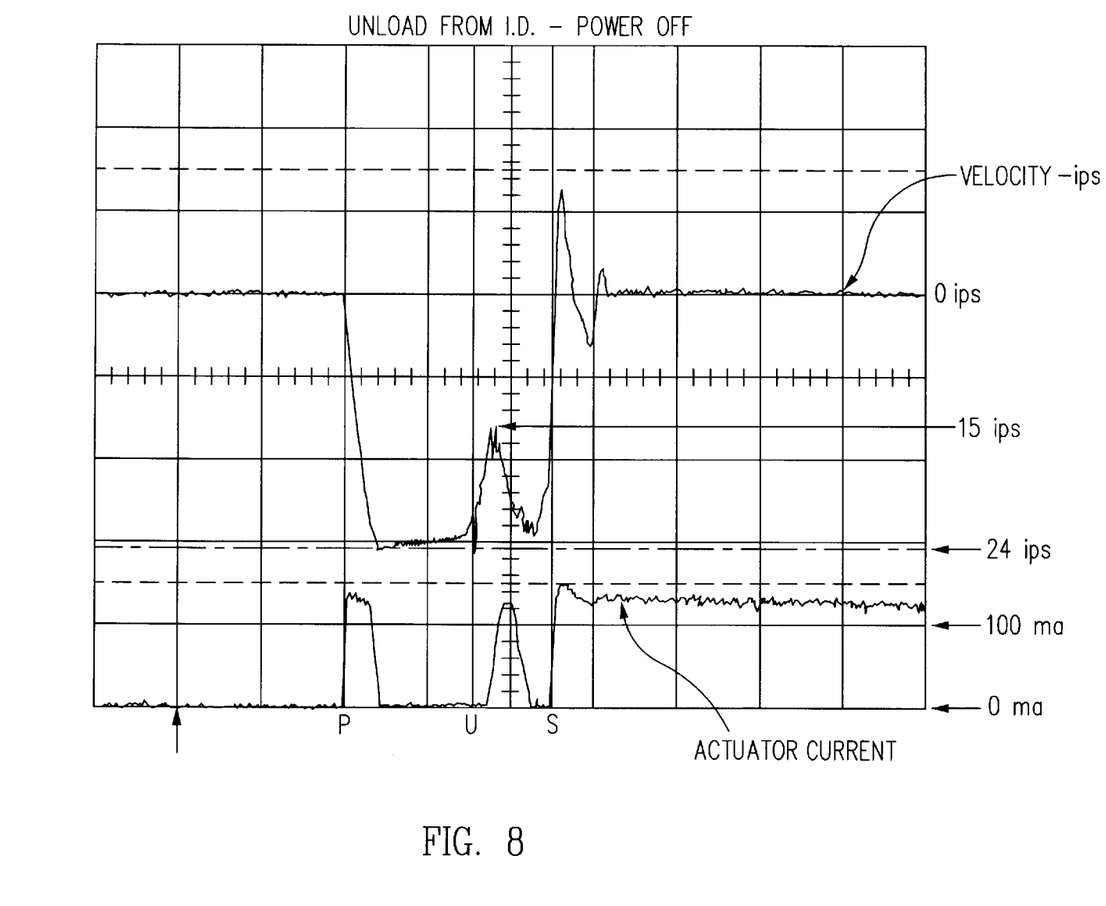
FIG. 8 graphs the velocity vs time and actuator current vs time of a head unloading system according to one embodiment of the present invention when the heads are over an inner diameter of the disk at the start of a power failure.

FIG. 8 depicts the velocity of the heads vs time as well as the actuator current vs time when the heads are near an inner diameter of the disk at the start of a power failure. As the head velocity surpasses approximately 24 ips the actuator current is reduced to zero to prevent further acceleration. After the heads reach the unloading cam at time U and slow down to approximately 15 ips, the actuator current is again increased to prevent the heads from slowing to a dangerously low velocity. The heads hit the outer crash stop at time S. The heads are subjected to small bounces off of the outer crash stop but are eventually brought to rest against the outer crash stop. The actuator current continues to force the heads against the outer crash stop.

Figure 9A:
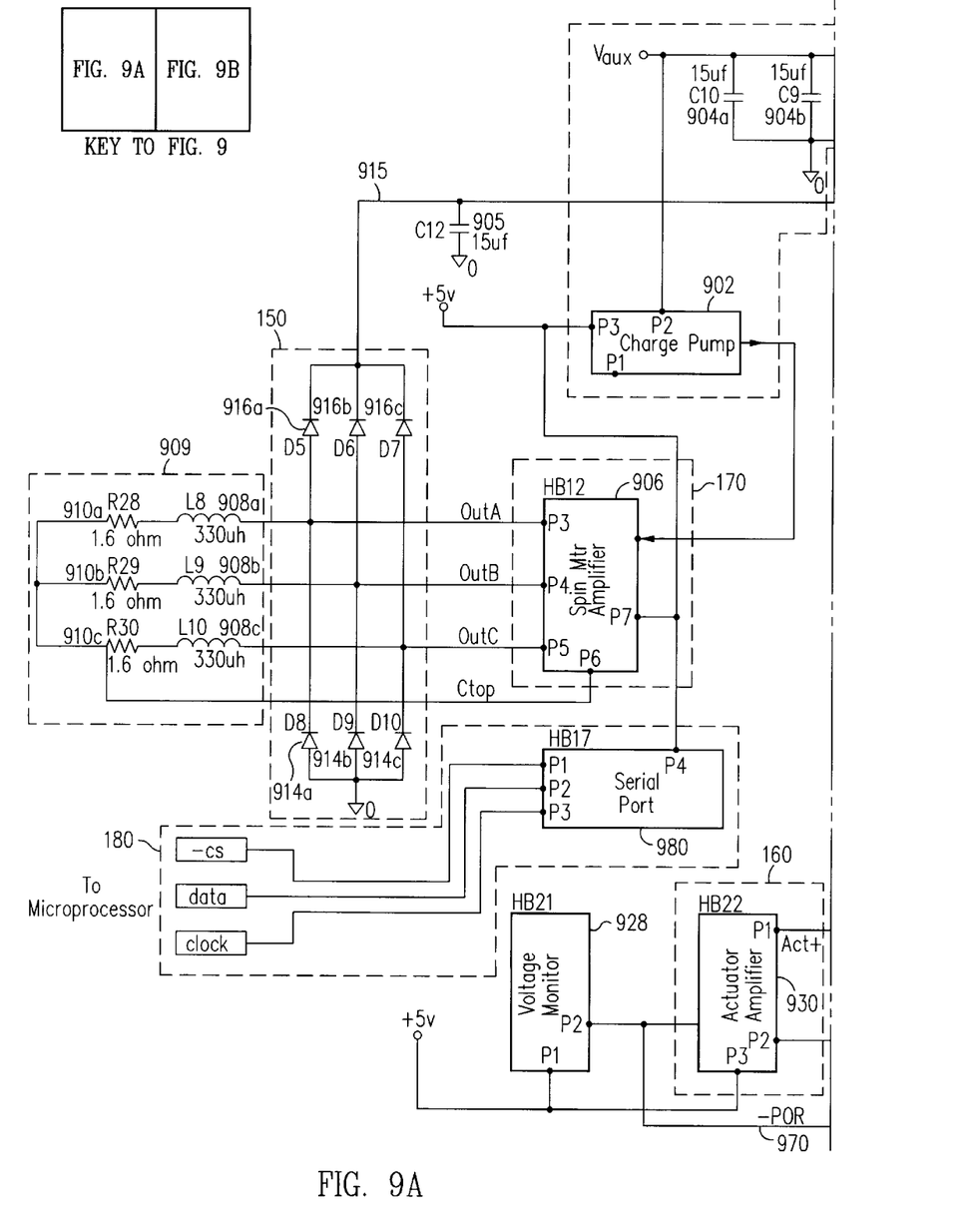
FIG. 9 shows a circuit diagram of a head unloading system according to one embodiment of the present invention.
Figure 9B:
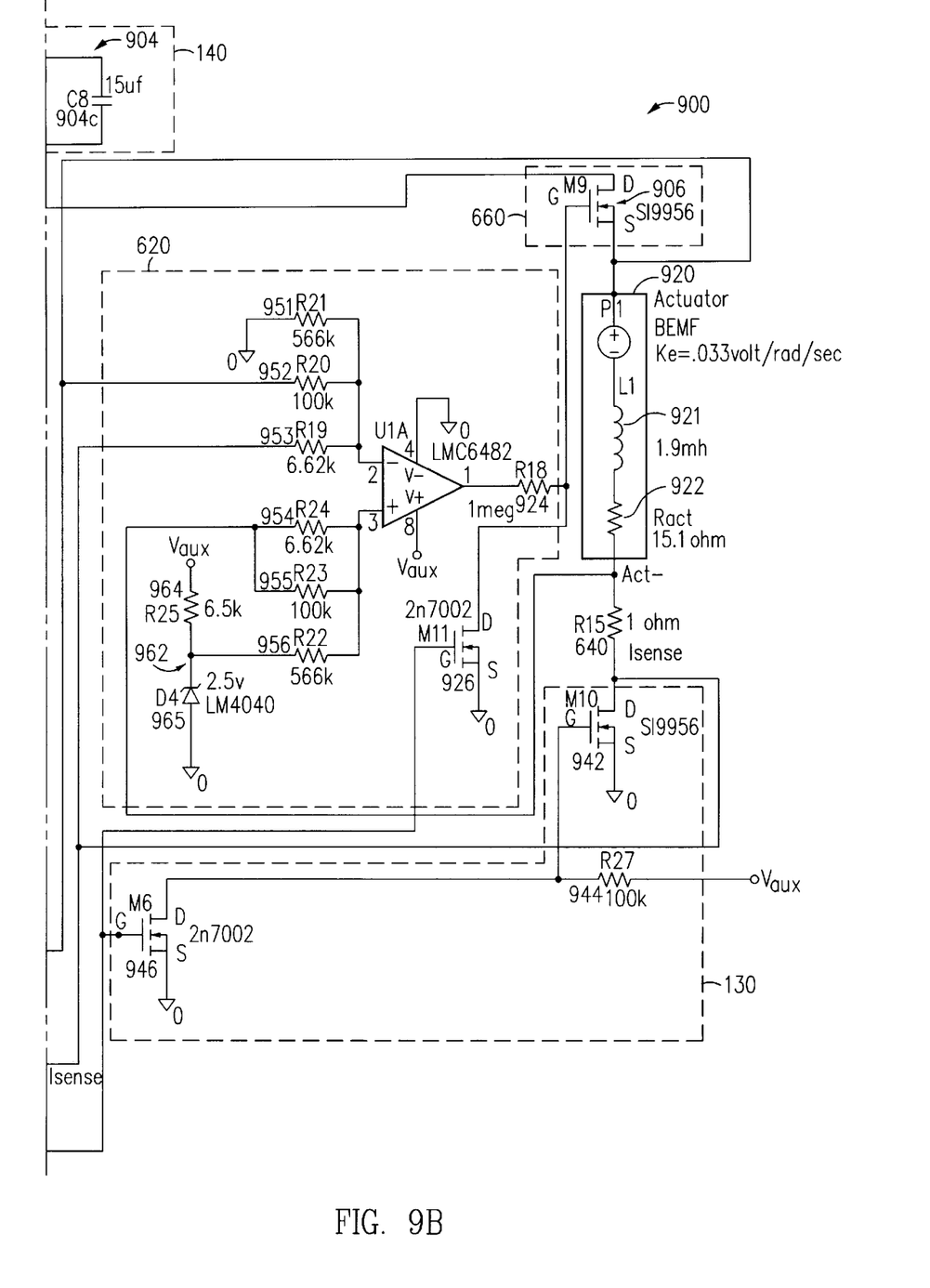

FIG. 9 shows a more detailed disk circuit 900 containing an unloading mechanism. Disk circuit 900 is controlled by a CPU (not shown) through serial port 980. Under normal operations positive terminal Act+ of actuator 920, i.e. a first terminal, receives power from actuator amplifier 930. Negative terminal Act– of actuator 920, i.e. a second terminal, is coupled to a first end of current sense resistor 640. A second end of current sense resistor 640 is coupled to actuator amplifier 930.

Charge pump 902 energizes auxiliary power supply 904 which is used only during power failures to power the head unloading circuits. Auxiliary power supply 904 is constructed to supply energy to the head unloading circuit for a much greater interval than is necessary to retract the heads from the disk, for example 60 mS. As shown in FIG. 9, a suitable auxiliary power supply can be constructed with three capacitors 904a, 904b, and 904c coupled in parallel between charge pump 902 and ground.

Three phase spin motor 909, represented by inductors 908a, 908b, or 908c and resistors 910a, 910b, or 910c, is coupled to spin motor amplifier 906, which supplies three phases of power a, b, and c. Three phase spin motor 909 is also coupled to the actuator through rectifier 150 and a field effect transistor (FET) 960.

For three phase spin motor 909, rectifier 150 is a three-phase rectifier comprising diodes 914a, 914b, and 914c which have their anodes coupled to grounds and their cathodes coupled to power phase a, b, and c respectively. Rectifier 150 further comprises diodes 916a, 916b, and 916c with their anodes coupled to power phases a, b, and c respectively and their cathodes coupled together to drain D of FET 960. Line 915 between rectifier 150 and FET 960 is also coupled to ground through capacitor 905 to stabilize the voltage.

Source terminal S of FET 960 is coupled to positive terminal Act+ of actuator 920. FET 960 acts as an amplifier to regulate current to actuator 920 during a power failure. Gate G of FET 960 is coupled to op-amp 923 through resistor 924 and to drain D of FET 926. In one embodiment of the invention, FET 960 is incorporated into op-amp 923. Source S of FET 926 is coupled to ground and gate G of FET 926 is coupled to "Power On/Reset" (POR) line 970. The voltage on POR line 970 is controlled by voltage monitor 928. Under normal operations POR line 970 is pulled high by voltage monitor 928; therefore, FET 926 conducts and pulls gate G of FET 960 low to prevent any power from three phase spin motor 909 reaching actuator 920. However, once a power failure occurs the voltage on POR line 970 goes low, which turns off FET 926 and allows gate G of FET 960 to be controlled solely by the output signal of op-amp 923.

During a power failure, FET 942 which has gate G coupled to resistor 944 and drain D of FET 946, source S coupled to ground, and drain D coupled to the second end of current sense resistor 640, provides the ground path for actuator 920. Resistor 944 is coupled to auxiliary power supply 904 to pull gate G of FET 942 high during a power failure. FET 946, which has source S coupled to ground and gate G coupled to POR line 970, pulls gate G of FET 942 low during normal operations to prevent FET 942 from providing a ground path for actuator 920.

As mentioned above, during a power failure op-amp 923 controls gate G of FET 960 to provide power to actuator 920. Op-amp 923 is powered by auxiliary power supply 904. The inverting input terminal of op-amp 923, i.e. a first input terminal, is coupled to ground through resistor 951, to positive terminal Act+ of actuator 920 through resistor 952, and to negative terminal Act– of actuator 920 through resistor 953 and current sense resistor 640. Specifically, the first end of current sense resistor 640 is coupled to negative terminal Act– of actuator 920, the second end of current sense resistor 640 is coupled to a first end of resistor 953, and the second end of resistor 953 is coupled to the inverting input terminal of op-amp 923. The non-inverting terminal, i.e. a second input terminal, of op-amp 923 is coupled to a reference voltage at node 962 through resistor 956 and to negative terminal Act– of actuator 920 through the parallel combination of resistors 954 and 955. The voltage at node 962 is generated by connecting resistor 964 between node 962 and the auxiliary power supply 904, and connecting the cathode of zener diode 965 to node 962 and the anode of diode 965 to ground. Zener diode 965 provides a 2.5 volt reference voltage to BEMF control circuit 620.

Actuator 920 is simply a magnetic motor which generates a bucking voltage proportional to the coil velocity known as the BEMF signal. However, a practical actuator coil is comprised of both an inductive portion and a resistive portion. As represented in FIG. 9 with inductor 921 and resistor 922. Since the actuator coil has a resistive component, direct measurement of the BEMF for use in velocity control is not feasible since the measured BEMF includes the voltage drop of the resistive component of actuator 920.

To overcome this problem, the present invention uses current sense resister 640 to simulate the actual coil resistance Ract. The BEMF of actuator 920 and the IR drop of the actual coil resistance Ract is measured by op-amp 923 through resistor 952, coupled between positive terminal Act+ of actuator 920 and the inverting terminal of op-amp 923, and resistor 955, coupled between negative terminal Act– of actuator 920 and the noninverting terminal of op-amp 923. The resistance of resistor 955 should equal the resistance of resistor 952. The voltage drop across the current sense resistor 640 is scaled by resistors 953 and 954 to equal the voltage drop due to the actual resistance of the coil. The scaled voltage drop is subtracted out by op-amp 923. The resistance of resistor 953, which should equal the resistance of resistor 954, is selected to equal approximately the resistance of current sense resistor 640 multiplied by the resistance of resistor 955 and divided by the actual coil resistance Ract.

The operating velocity switch point of op-amp 923 is set through resistors 951 and 956, with diode 965 and resistor 964. Op-amp 923 applies a signal to FET 960 to control the current flow through the actuator coil to maintain an approximately constant BEMF signal which, in turn, results in constant actuator velocity.

As the velocity of the heads increase the BEMF also increases. If the BEMF increases beyond a safe level, op-amp 923 lowers the voltage on gate G of FET 960. With a lower gate voltage the current from FET 960 to actuator 920 is decreased or even eliminated. Since the current through the actuator is the driving force on the heads, reduction or elimination of the current prevents the heads from accelerating to a greater velocity.

If the velocity of the heads decreases the BEMF also decreases. If the BEMF decreases below a safe level, op-amp 923 increases the voltage on gate G of FET 960. With a higher gate voltage the current from FET 960 is increased. The increased current in actuator 920 results in acceleration of the heads to a safer velocity.

The resistance of resistor 951, which should equal the resistance of resistor 956, is selected so that the voltage at the non-inverting terminal of op-amp 923 is equal to the voltage at the inverting terminal of op-amp 923 when the BEMF of the actuator corresponds to a desired safe speed of the actuator. Specifically, the resistance of resistor 956 is approximately equal to the resistance of resistor 955 multiplied by the voltage drop provided by zener diode 965, divided by the desired BEMF voltage. In the embodiment of FIG. 9, an actuator speed of 20 ips results in a BEMF voltage of 0.44 volts.

The present invention can be implemented using various integrated circuits. The Allegro 8920 provides 6 diodes which can be used to form rectifier 150 as described above. The Allegro 8902 can be used for charge pump 902, spin motor amplifier 906, and serial port 980. The Allegro 8932 can be used for voltage monitor 928 and actuator amplifier 930.

Furthermore, other similar parts can be used. For example, the Allegro 8902 is similar to the Philips TDA5341, Silicon Systems 32M595, and Hitachi HA13501S. The Allegro 8932 is similar to the Cherry Semiconductor CS-7102 and Silicon Systems 32H6510.

Figure 10A:
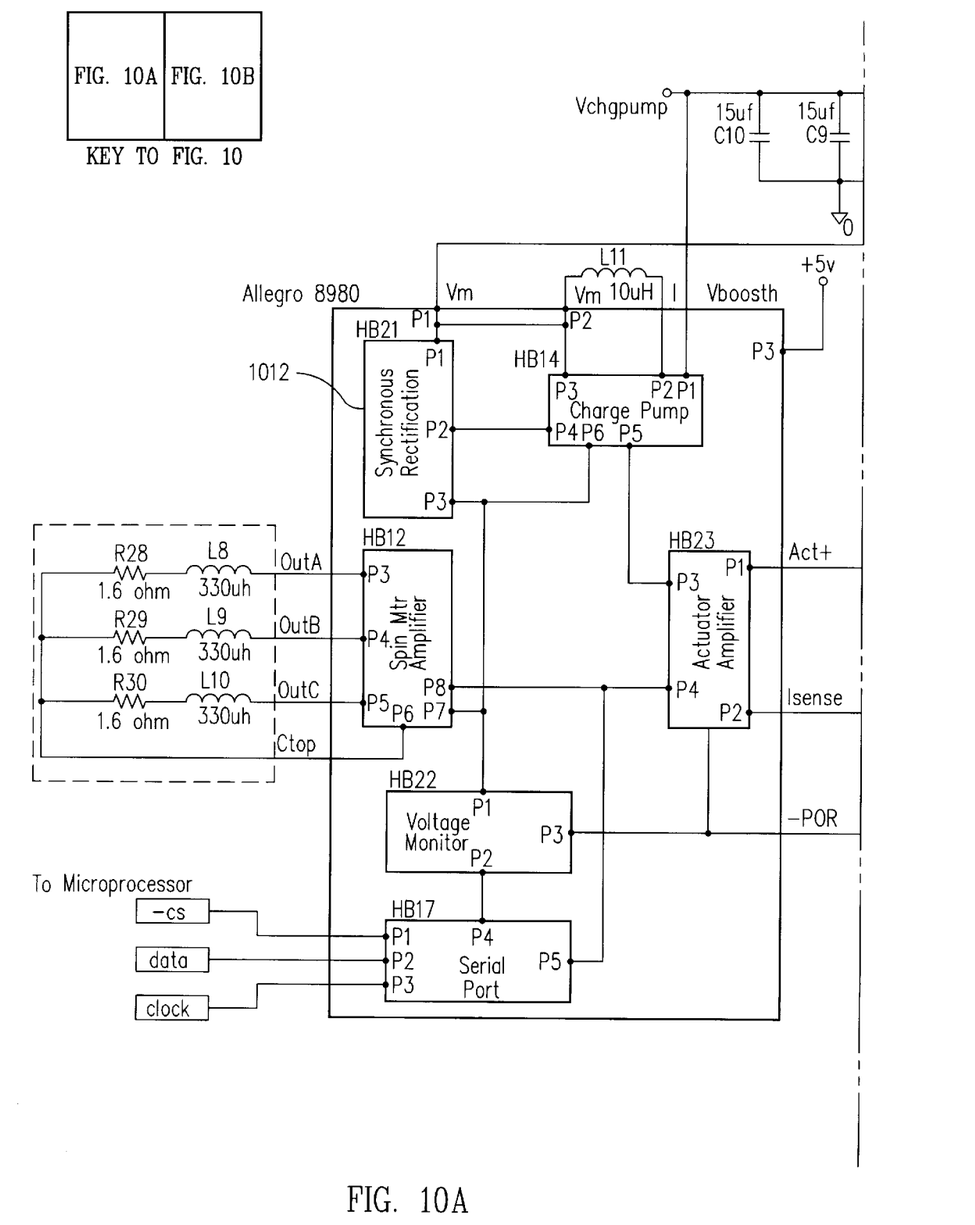
FIG. 10 shows a circuit diagram of a head unloading system according to a second embodiment of the present invention.
Figure 10B:
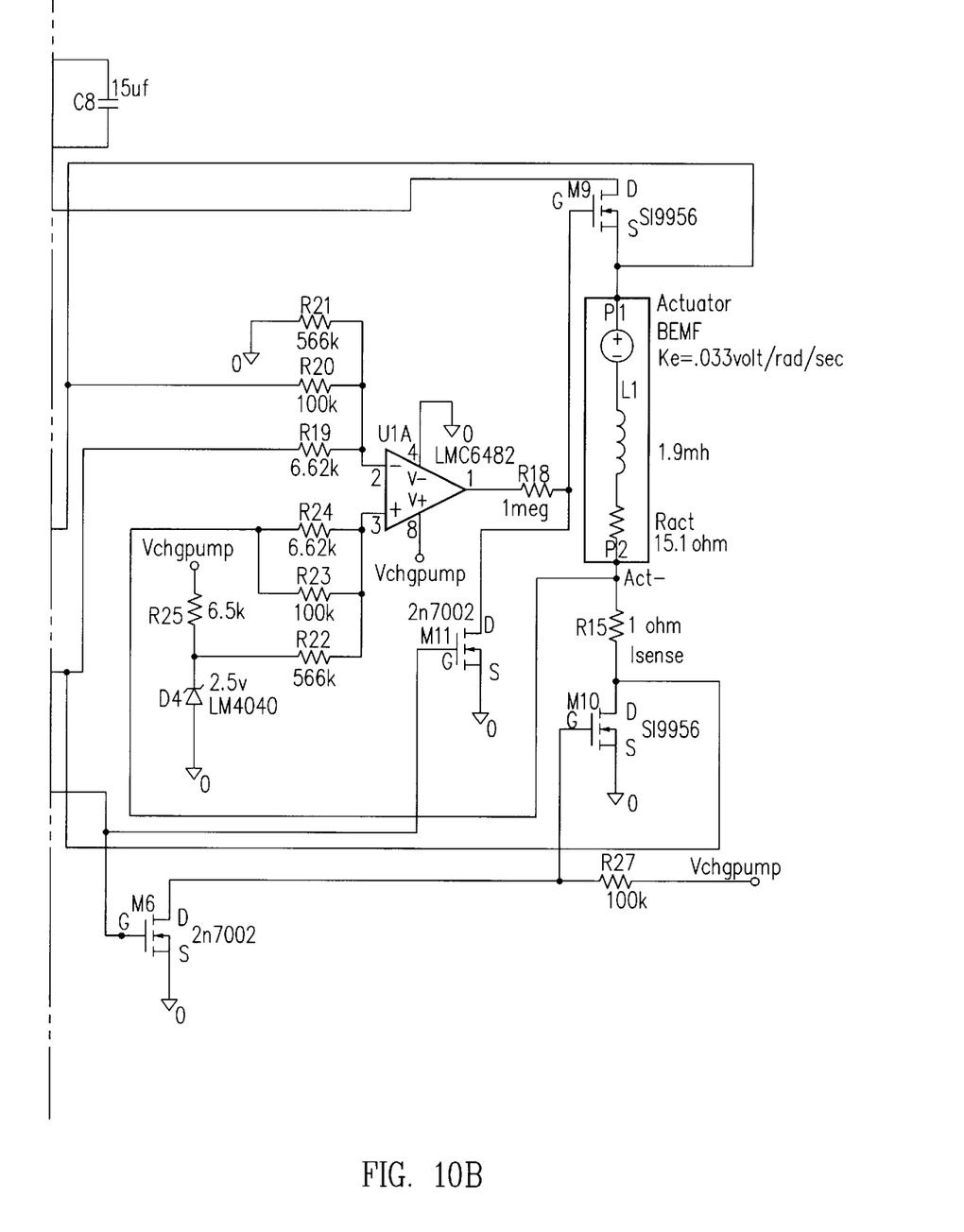

In a second embodiment of the invention, shown in FIG. 10, rectifier 150 is a synchronous rectifier 1012. The second embodiment improves the DC recovery efficiency by eliminating the voltage drops of the rectifier diodes. Furthermore, the second embodiment can use the Allegro 8980 for synchronous rectifier 1012, charge pump 902, spin motor amplifier 906, serial port 980, voltage monitor 928 and actuator amplifier 930. An inductor 1020 is coupled to the charge pump to provide stability as well as to provide a storage device to make a step up switch regulator. The SGS Thompson L6260 can be used in place of the Allegro 8980.

In either embodiment the value of the various discrete components can vary. However the following table provides a set of values which produce reliable results.

| Component | Reference Numerals | Value or Part No. |
| --- | --- | --- |
| Capacitor | 904a, 904b, 904c | 15 $\mu$f |
| Inductor | 908a, 908b, 908c | 330 $\mu$h |
| Resistor | 910a, 910b, 910c | 1.6 $\Omega$ |
| Resistor | 951, 956 | 566 K$\Omega$ |
| Resistor | 944, 952, 955 | 100 k$\Omega$ |
| Resistor | 953, 954 | 6.62 K$\Omega$ |
| Resistor | 930 | 1 $\Omega$ |
| Resistor | 924 | 1 M$\Omega$ |
| Resistor | 964 | 6.5 K$\Omega$ |
| FET | 942, 960 | SI9956 |
| FET | 926, 946 | 2n7002 |
| Diode | 965 | LM4040 |
| Op-amp | 923 | LMC6482 |

In the various embodiments of this invention, a method and structure has been described that eliminates the shortcomings of prior art power failure unloading systems which applied the BEMF of the spin motor directly to the actuator. The use of sensing mechanism to control the actuator current based on the velocity of the actuator provides a more constant velocity during unloading of the heads regardless of the initial position of the heads.

The various embodiments described herein are illustrative only of the principles of this invention and are not intended to limit the invention to the particular implementations described. Those skilled in the art will be able to use the principles of this invention in any application which must limit the maximum and minimum velocity of an actuator.

I claim:

1. A velocity controlled head unloading system comprising:

an actuator having a first terminal and a second terminal;

a sense resistor having a first end and a second end, wherein said first end of said sense resistor is coupled to said second terminal of said actuator;

an amplifier coupled to a power source and said first terminal of said actuator;

an actuator BEMF control circuit coupled to said amplifier, said first terminal of said actuator, said second terminal of said actuator, said second end of said sense resistor, and to a reference voltage node, wherein said actuator BEMF control circuit uses a reference voltage of said reference voltage node, a BEMF of said actuator, and a voltage drop across said sense resistor to control said amplifier and in turn said amplifier regulates an actuator current to said actuator;

wherein said actuator BEMF control circuit comprises an op-amp with an output terminal, a first input terminal, and a second input terminal; and wherein one of said first and second input terminals comprises an inverting terminal, and said inverting terminal is coupled through a first resistor to ground, through a second resistor to said first terminal of said actuator, and through a third resistor to said second end of said sense resistor;

said second input terminal of said op-amp is coupled through a fourth resistor to said reference voltage node, and through a fifth resistor in parallel with a sixth resistor to said second terminal of said actuator; and said output terminal of said op-amp is coupled through a seventh resistor to said amplifier.

2. The system of claim 1, wherein said amplifier comprises a transistor.

3. The system of claim 1, wherein said power source is a spin motor of a disk drive.

4. The system of claim 3, wherein said system further comprises a charge pump and an auxiliary power supply; wherein said auxiliary power supply provides power to said actuator BEMF control circuit during a power failure.

5. A method for controlling an actuator comprising:

measuring a back electro-motive force of an actuator having a first terminal and a second terminal;

approximating a voltage drop due to an inherent resistance of said actuator; and controlling an actuator current of said actuator based on said back electro-motive force and said voltage drop, wherein said controlling an actuator current of said actuator based on said back electro-motive force and said voltage drop comprises: generating a control signal to an amplifier with an op-amp; and regulating said actuator current with said amplifier;

wherein said op-amp has an output terminal, a first input terminal, and a second input terminal; and wherein one of said first and second input terminals comprises an inverting terminal, and said inverting terminal is coupled through a first resistor to ground, through a second resistor to said first terminal of said actuator, and through a third resistor to said second end of said sense resistor;

said second input terminal of said op-amp is coupled through a fourth resistor to said reference voltage node, and through a fifth resistor in parallel with a sixth resistor to said second terminal of said actuator; and said output terminal of said op-amp is coupled through a seventh resistor to said amplifier.

6. The method of claim 5 further comprising prior to said measuring a back electromotive force of an actuator:

energizing an auxiliary power supply;

determining if a power failure condition exists; and obtaining power for said actuator current from a spin motor.

* * * * *